2,717,884

SOIL CONDITIONING COMPOSITION

Henry Leighton Morrill, Clayton, Mo., assignor to Monsanto Chemical Company, St. Louis, Mo., a corporation of Delaware No Drawing. Application July 26, 1954,
Serial No. 445,907

11 Claims. (Cl. 260—33.2)

This invention relates to a new composition of matter having substantial utility as a soil conditioning agent. More specifically the invention relates to a copolymer of isobutylene and the half ammonium salt, half amide of maleic acid which contains mixed therewith a substantial proportion of a higher glycol.

In U. S. Patent 2,625,529, issued January 13, 1953, there are described a large number of water-soluble polyelectrolytic polymers which have the ability to stabilize soil aggregates and render them capable of withstanding natural erosive forces. Soils containing aggregates stabilized in this manner resemble naturally fertile soils and have the capacity of supporting plant life due to the presence of a large proportion of interstices which permit the rapid draining of excess moisture and at the same time retaining adequate moisture within the stable aggregates. Thus normally infertile soils can be converted into useful agricultural soils by treatment in accordance with the methods described in the said patent.

One of the polymers described in U. S. Patent 2,625,529 is prepared by the copolymerization of isobutylene and maleic anhydride to form a water-insoluble resinous composition which then may be reacted with gaseous ammonia, ammonium hydroxide or aqueous solutions of ammonium hydroxide and a water-soluble polymer is thereby formed. The polymer is definitely identified as a copolymer of isobutylene and maleic acid and it is believed to contain amide groups. There is substantial scientific evidence to establish it as a composition having the structural formula

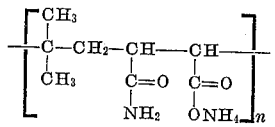

This compound is substantially better in its soil conditioning effect than many other compounds of comparable polyelectrolytic properties and of equal theoretical applicability. In other words, a smaller proportion of this polymer is required to effect a desirable improvement in the condition of the soil than is required of most of the other polymers. This unusual utility, which is definitely established by laboratory preparations, has been minimized with respect to its importance in view of certain disadvantageous aspects involved in its manufacture. It has been found that when the polymer is ground to the finely divided state desirable for its use in the conventional manner, it acquires an electrostatic charge which complicates screening and creates a dusting problem and an explosion hazard. Thus the manufacture, handling and packaging have involved dangerous working conditions for the personnel and risk of loss of buildings and machinery by explosion and fire. It has also been found that the polymers are difficult to formulate in a manner which enables them to flow freely from containers and to be spread uniformly as a solid powder on the soil in one of the usual soil treating procedures.

It has been found that if the polymer is mixed with a relatively small proportion of a glycol having the following structure

HO—R—OH wherein R is selected from the group consisting of alkylene and oxaalkylene radicals having molecular weights between 42 and 116 and wherein the hydroxyl groups are attached to separate carbon atoms, the static charges on the particles are almost completely eliminated, the dusting problem is completely solved and the formulation into a free-flowing powder is facilitated. The above structural formula includes glycols such as hexylene glycol, diethylene glycol, propylene glycol, dipropylene glycol, tetramethylene glycol and triethylene glycol. The class of useful glycols is limited to those included within the scope of the above structural formula. It has been established that ethylene glycol and glycerol, both similar in structure to the glycols of the above structural formula, are not effective in satisfactorily solving the problem presented in the preparation of the copolymers of isobutylene and the half ammonium salt-half amide of maleic acid.

In the practice of this invention, the copolymerization of maleic anhydride with isobutylene may be practiced in the manner of the prior art, for example as described in U. S. Patent 2,504,003 and U. S. Patent 2,378,629, and the resulting copolymers may be treated with ammonia, for example by the procedure described in the U. S. Patent 2,504,003. However, preferred procedure for the treatment with ammonia involves suspending the polymer in a non-solvent such as benzene or toluene and the ammonia gas bubbled through the resulting slurry. The amide ammonium salt prepared by this procedure is separated by the evaporation of the benzene. In accordance with this invention the glycol may be added to the suspension of the polymer in the non-solvent or it may be added to the solid polymer after the evaporation of the suspending medium. In either case, it is present admixed with the polymer during the grinding operation and serves to prevent the dispersion of the finely divided polymer in the atmosphere. The presence of the glycol also facilitates the screening operation by preventing the attraction between the polymer and the screen and between the polymer and diluents or extenders which may be added in the formulation of a free-flowing solid powder.

Further details of the preparation and formulation of the new composition are set forth with respect to the following example.

Example

A copolymer of isobutylene and maleic anhydride was suspended in benzene to form a slurry containing 16 percent solid polymer. Gaseous ammonia was bubbled through the slurry until the polymer became saturated. 5 parts by weight of hexylene glycol for each 100 parts of suspended solid was added. Upon the evaporation of the benzene, a finely divided polymer containing a coating or film of the glycol was obtained. The resulting product was readily reduced to a free-flowing state and during the grinding operation did not dust and did not appear to acquire static charges.

What is claimed is:

1. A soil conditioning composition which comprises an ammonium salt of a copolymer of isobutylene and maleic acid containing admixed therewith a glycol having the formula

HO—R—OH wherein R is selected from the group consisting of alkylene and oxaalkylene radicals having molecular weights between 42 and 116 and wherein the hydroxyl groups are attached to separate carbon atoms.

2. A soil conditioning composition which comprises an ammonium salt of a copolymer of isobutylene and maleic acid containing admixed therewith from 1 to 10 percent of a glycol having the formula

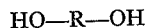
HO—R—OH wherein R is selected from the group consisting of alkylene and oxaalkylene radicals having molecular weights between 42 and 116 and wherein the hydroxyl groups are attached to separate carbon atoms.

3. A soil conditioning composition which comprises an ammonium salt of a copolymer of isobutylene and maleic acid containing admixed therewith from 2 to 5 percent of a glycol having the formula

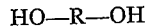
HO—R—OH wherein R is selected from the group consisting of alkylene and oxaalkylene radicals having molecular weights between 42 and 116 and wherein the hydroxyl groups are attached to separate carbon atoms.

4. A soil conditioning composition comprising the half ammonium salt-half amide of the copolymer of isobutylene and maleic acid and a glycol having the structural formula

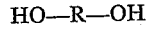
HO—R—OH wherein R is selected from the group consisting of alkylene and oxaalkylene radicals having molecular weights between 42 and 116 and wherein the hydroxyl groups are attached to separate carbon atoms.

5. A soil conditioning composition comprising the half ammonium salt-half amide of the copolymer of isobutylene and maleic acid and from 1 to 10 percent of a glycol having the structural formula

HO—R—OH wherein R is selected from the group consisting of alkylene and oxaalkylene radicals having molecular weights between 42 and 116 and wherein the hydroxyl groups are attached to separate carbon atoms.

6. A soil conditioning composition comprising the half ammonium salt-half amide of the copolymer of isobutylene and maleic acid and from 2 to 5 percent of a glycol having the structural formula

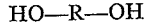
HO—R—OH wherein R is selected from the group consisting of alkylene and oxaalkylene radicals having molecular weights between 42 and 116 and wherein the hydroxyl groups are attached to separate carbon atoms.

7. The composition defined by claim 4 in which the glycol is hexylene glycol.

8. The composition defined by claim 4 in which the glycol is diethylene glycol.

9. The composition defined by claim 4 in which the glycol is propylene glycol.

10. The composition defined by claim 4 in which the glycol is dipropylene glycol.

11. The composition defined by claim 4 in which the glycol is triethylene glycol.

No references cited.